Aug. 29, 1933.  B. E. MILLS  1,924,620
REMOTE CONTROL SELECTIVE DEVICE FOR AUTOMATIC
MULTIPLE RECORD PHONOGRAPHS OR THE LIKE
Filed Jan. 15, 1931  5 Sheets-Sheet 2
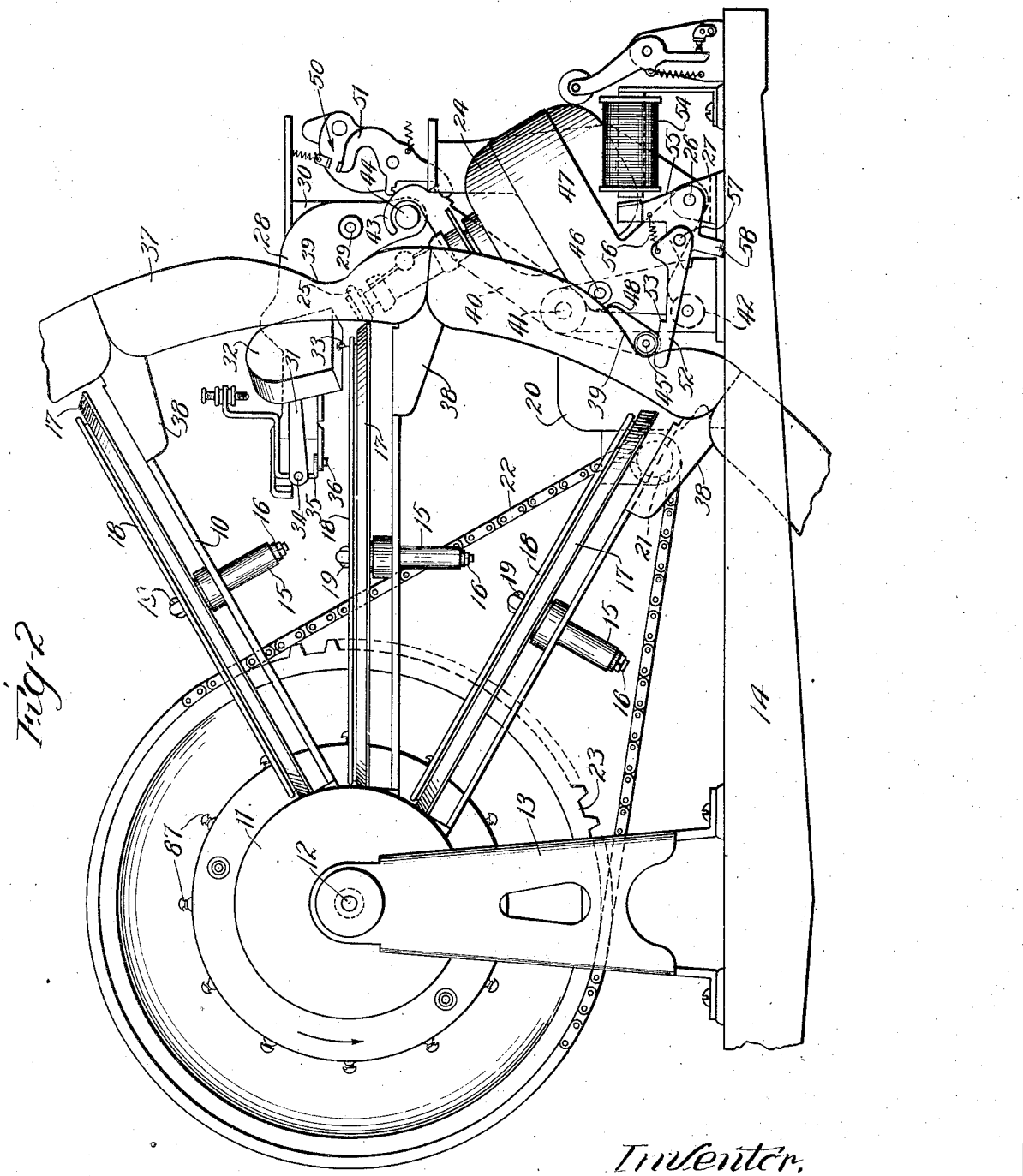

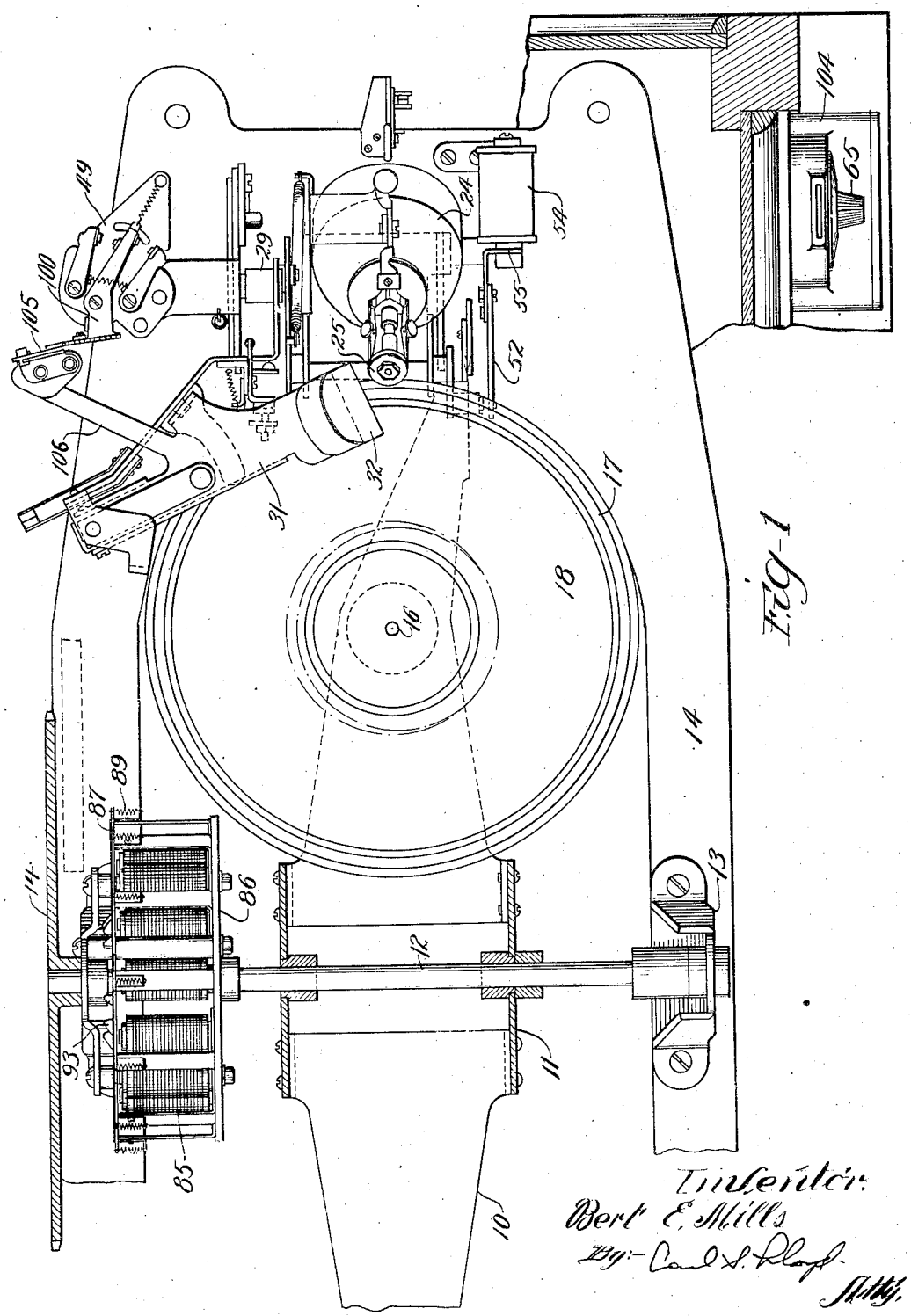
Aug. 29, 1933. B. E. MILLS 1,924,620
REMOTE CONTROL SELECTIVE DEVICE FOR AUTOMATIC
MULTIPLE RECORD PHONOGRAPHS OR THE LIKE
Filed Jan. 15, 1931 5 Sheets-Sheet 1

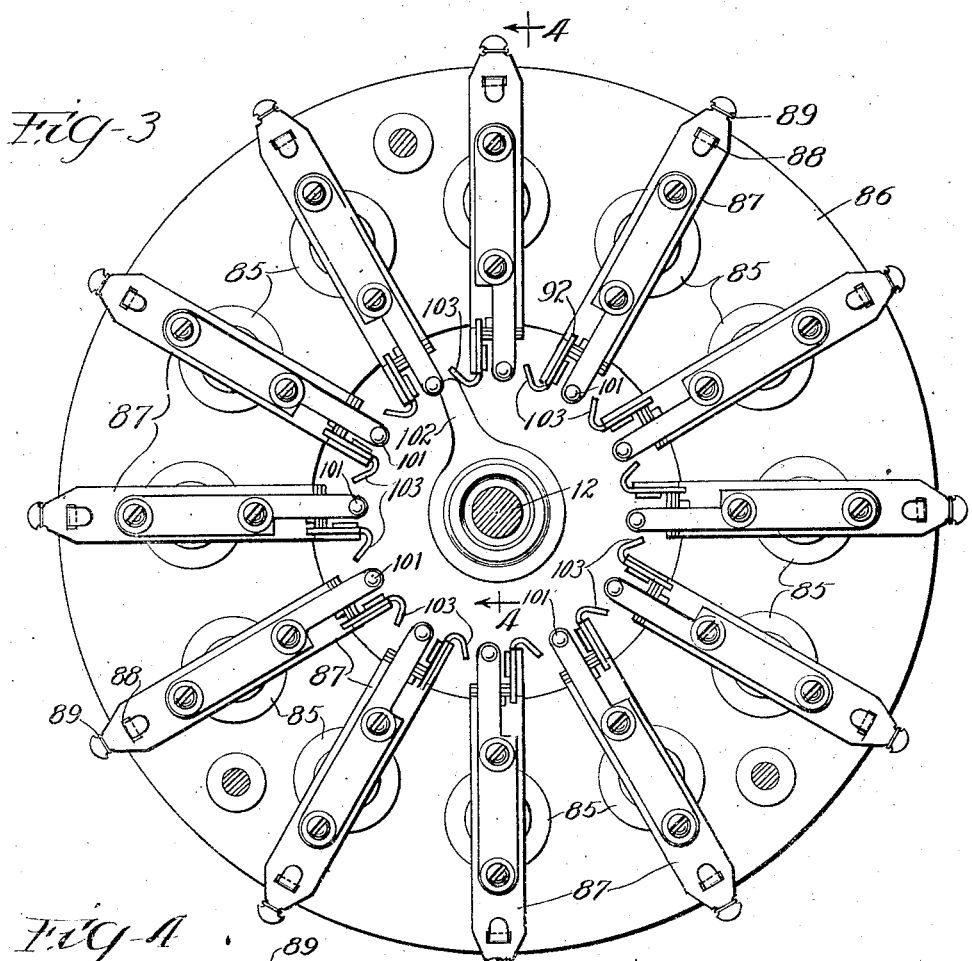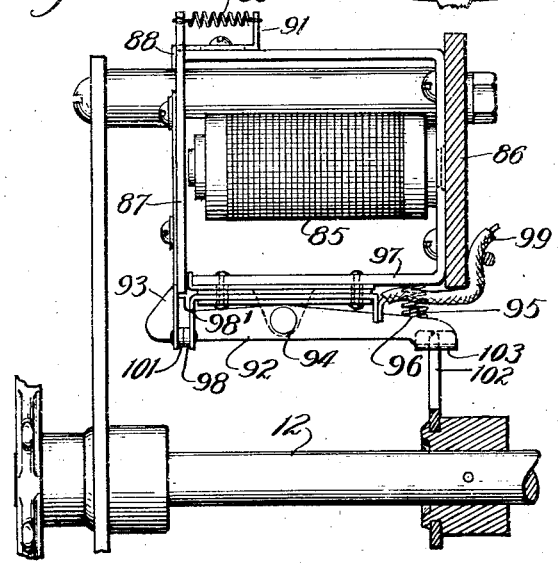

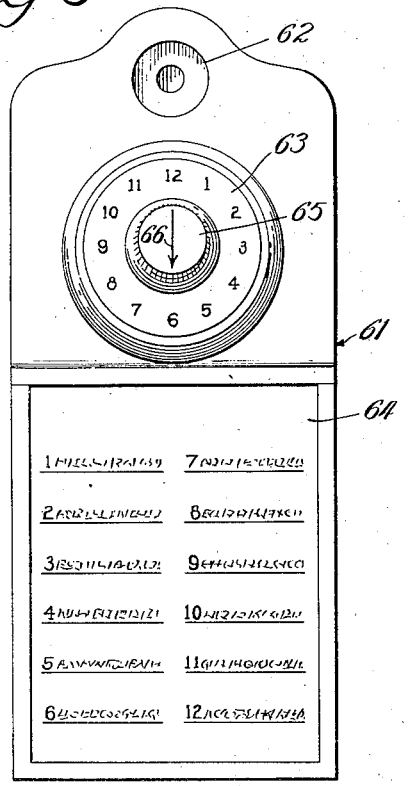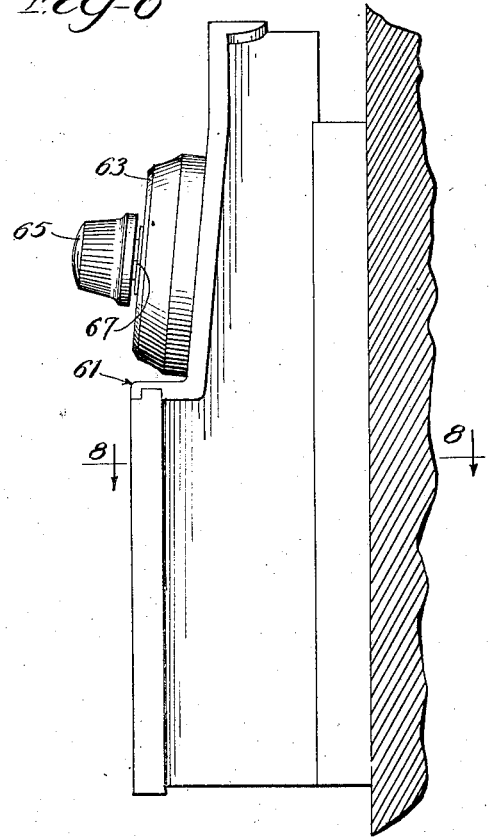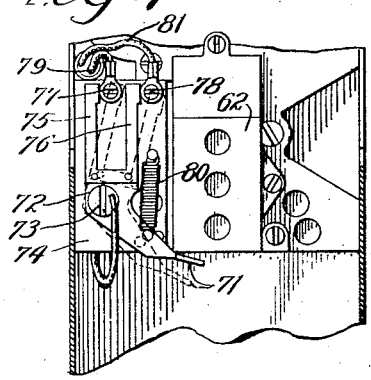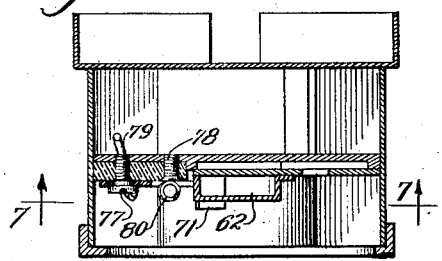

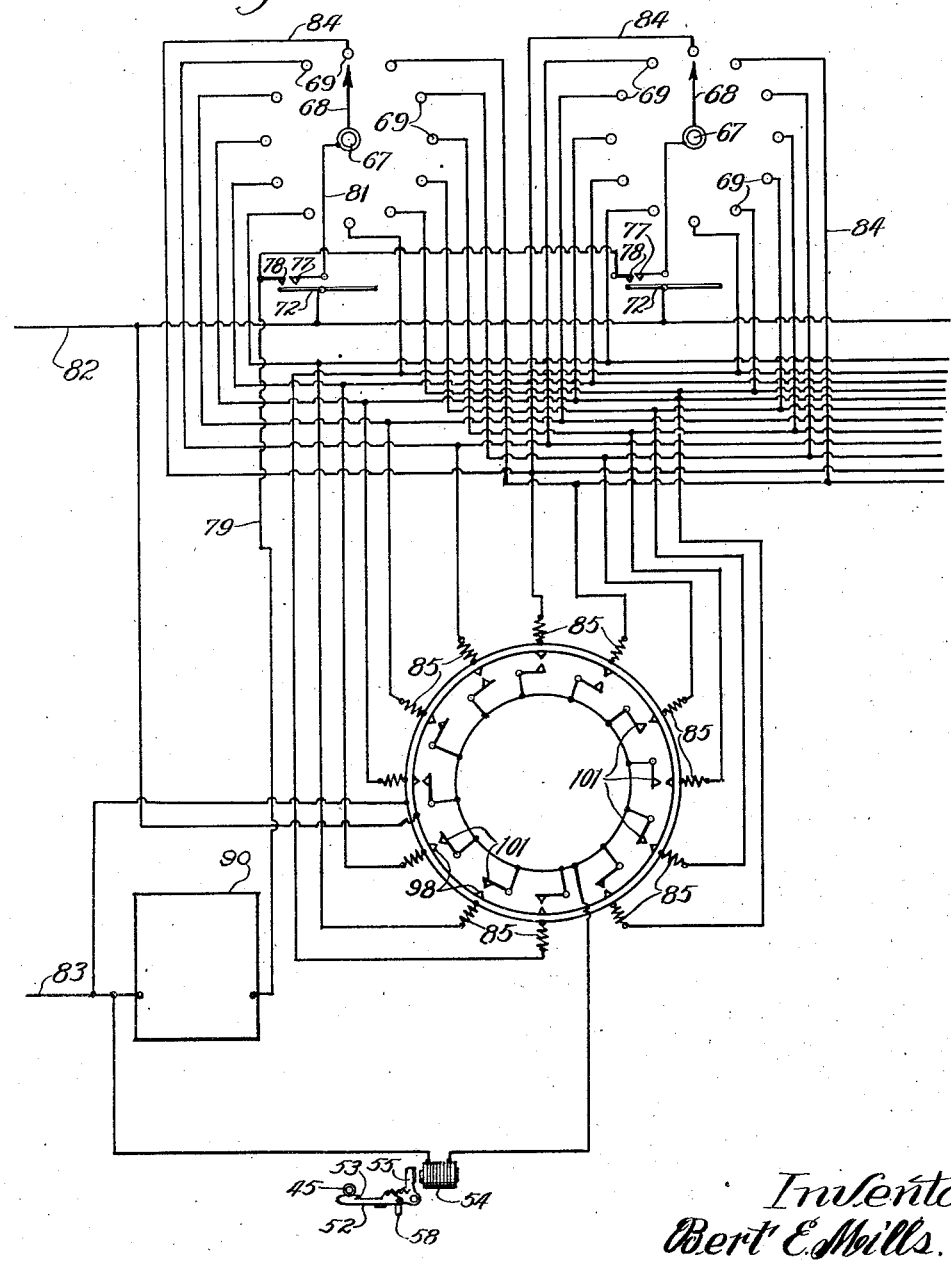

Patented Aug. 29, 1933

1,924,620

UNITED STATES PATENT OFFICE 1,924,620

REMOTE CONTROL SELECTIVE DEVICE FOR AUTOMATIC MULTIPLE-RECORD PHONOGRAPHS OR THE LIKE

Bert E. Mills, Oak Park, Ill., assignor to Mills Novelty Company, Chicago, Ill., a corporation of Illinois Application January 15, 1931.- Serial No. 508,937

14 Claims. (Cl. 274—10)

This invention relates to selector mechanism for automatic multiple-record phonographs or the like and has for its principal object the provision of a selector mechanism operable from a remote position, as, for example, a wall-box station in case the phonograph is used in a restaurant or other public place in which provision is made for operating it by insertion of coins in wall-boxes located at various points in the room.

A further object of the invention is the provision of a selector mechanism of new design which is usable for the same general purpose as the mechanism of my Patent No. 1,864,143, issued June 21, 1932.

Other objects and advantages of the invention will be apparent as it is better understood from the following description, which, taken in connection with the accompanying drawings, discloses a preferred embodiment thereof.

Referring to the drawings:

Fig. 1 is a plan view, partially in section, of an automatic multiple-record phonograph equipped with the device of my invention;

Fig. 2 is an elevational view of certain parts of the phonograph mechanism, showing the means for controlling the operation of the tone arm or reproducer;

Fig. 3 is an elevational view of the series of magnets and associated parts shown at the upper lefthand corner of Fig. 1;

Fig. 4 is a sectional and elevational view taken substantially on the section line 4—4 of Fig. 3;

Fig. 5 is an elevational view of a wall-box equipped with selector mechanism forming a part of my invention;

Fig. 6 is a side elevation thereof;

Fig. 7 is a vertical, sectional view illustrating the double contact switch contained in the wall box, this view being taken substantially on the section line 7—7 of Fig. 8;

Fig. 8 is a transverse sectional view through the wall-box, taken substantially on the plane 8—8 in Fig. 6; and Fig. 9 is a wiring diagram showing the relation of the electrical units employed in the apparatus of my invention.

In said drawings, illustrating the best manner in which I have thus far contemplated applying the principles of my invention, I have shown a series of record holders 10 which are secured to and radially disposed about a hub 11, which is carried by a shaft 12, said shaft being journaled at its opposite ends in a pair of uprights 13, which are secured to a base 14. The record holders 10 are provided centrally with apertures in which are mounted sleeves 15. Record supporting spindles 16 are carried in the sleeves 15 and are adapted for free rotation therein. Records 18 are releasably secured to record supporting plates 17 by clips 19. The record holder shaft 12 is rotated by a motor 20, the armature of which is suitably geared to a gear wheel 21, which drives a chain 22, which in turn drives a sprocket wheel 23 mounted on the shaft 12.

The records are driven by a disc motor 24, the armature of which carries a friction drive wheel 25 which engages the bevelled face of the record supporting plates 17. The disc motor 24 is pivotally mounted at 26 in a yoke 27 which is attached to the base 14.

The reproducer assembly comprises a tone arm support member 28 which is pivotally secured at 29 to an upright 30; and a tone arm 31 carrying a pick-up element 32 equipped with a needle 33 which traverses the tone grooves of the records. The tone arm 31 is arranged for double pivotal movement relative to the tone arm support member 28, being pivoted at 34 to a bracket 35 to permit vertical turning of said arm, said bracket 35 being in turn pivoted at 36 to the tone arm support member 28 to permit horizontal turning or swinging of the tone arm.

The reproducer assembly and the disc motor 24 are automatically moved into and out of operative relation to the records by the movement of the record carrier. The mechanism for this purpose comprises a cam ring 37, disposed about the record holders 10 and secured thereby by brackets 38, said ring being provided with a series of cam grooves 39 corresponding in number to the number of record holders; and a lever 40 pivotally mounted at 41 to a yoke 42 which is secured to the base 14. The lever 40 is provided at one end with a hook portion 43 adapted to engage a stud 44 carried by the tone arm support member 28, and at the other end said lever is provided with a cam roller 45 which is adapted to ride on the cam ring 37. It will be apparent that when the cam roller 45 falls into one of the cam grooves 39, the lever 40 will be turned in a clockwise direction, viewing Fig. 2, and the reproducer assembly will be tilted into horizontal operative position. The disc motor 24 is tilted into and out of operative position through the action of a cam stud 46 which is secured to an apron 47 carried by the shell of the motor 24. The cam stud 46 is adapted to engage a cam groove 48 which is formed in the lower end of the lever 40. It will be apparent that when the lever 40 is turned to raise the reproducer assembly the disc drive motor 24 will be simultaneously tilted into semi-vertical, inoperative position by the action of the cam groove 48 on the cam stud 46.

The record changing motor 20 is periodically energized to move the records to and from the playing station. For this purpose there is provided an automatic cut-off switch 49 which is actuated by the movement of the tone arm at the end of the record to close a circuit through the record changing motor 20. The automatic cut-off switch just referred to forms the subject matter of my co-pending application, Serial No. 427,359, filed February 10, 1930, and need not be here described in detail. A switch arm 100 is adapted to be actuated upon the completion of a record by means of a pawl 105 carried on an arm 106 projecting laterally from the tone arm 31, this operation being fully described in said co-pending application. When the tone arm 31 is tilted into inoperative position the automatic cut-off switch 49 will have been opened and a running switch 50 is provided for carrying the circuit through the record changing motor 20 after said automatic cut-off switch 49 has thus been opened.

The running switch 50 includes a switch arm 51 which is controlled by the movement of the lever 40, so that the switch is automatically opened when the record has arrived at the playing station. As will subsequently appear in the description of Fig. 9, the disc motor 24 is placed directly across the line and is designed for continuous operation until the main line circuit is automatically opened by a suitable coin control device hereinafter mentioned. The record changing motor 20 is also arranged to be cut off by the multiple coin control device when the number of records corresponding to the number of coins inserted have been played.

The selector mechanism comprises means for controlling the lever 40 in such manner as to cause the latter to hold the reproducer in inoperative position until the selected record arrives at the playing station. Said means includes a latch member 52 (Fig. 2) which is provided with a notch 53 adapted to releasably engage the cam roller 45 carried by said lever 40. In the released or unlatched position shown in Fig. 2, said cam roller 45 is free to follow the cam 37, permitting the reproducer to move into operative position when said roller enters one of the grooves 39 in said cam.

When, however, said cam roller 45 is engaged in the notch 53, it is not free to follow the cam surface, and therefore the reproducer is held out of operative position until said roller is released by the latch. Furthermore, since the running switch 50 remains closed so long as the reproducer is in tilted or inoperative position, the record carrier will continue to rotate without stopping until the selected record arrives at the playing station, at which time, but not before, the reproducer is permitted to turn on the pivot 29, which causes the running switch 50 to be opened, thereby stopping the carrier.

Said latch member 52 is adapted to be held in raised position, in which the notch 53 will engage and retain the roller 45 when the latter is moved outwardly by the high part of the cam 37, by means of a magnet 54 which is provided with an armature 55 pivotally mounted at 26 in the yoke 27, said latch being pivotally secured to the armature at 57 and having yielding connection therewith provided by means of a spring 56 connected at one end to said latch and at the other end to the armature, as shown in said Fig. 2. The armature is provided with a stop arm 58, which, in the released position, engages the base 14.

It will be apparent that when the magnet 54 is energized the armature 55 will be attracted to said magnet and the latch member 52 will be held in raised position to prevent disengagement of the cam roller 45 from the notch 53 after such engagement is effected by initial rotation of the carrier following completion of a record. When the magnet 54 is deenergized, the armature 55 is released and the latch member 52 is dropped, whereupon the cam roller 45 is free to enter the next cam groove 39 to permit the playing of a record.

So much of the mechanism as has thus far been described is also shown in my copending application Serial No. 427,359 above-mentioned, and the novelty of the present invention resides in the devices, to be now described, for controlling the energizing and deenergizing of the magnet 54 to permit the phonograph to play only the selected record after a setting of the selector in the manner which will presently appear, said devices being particularly adapted for control of the operation of the phonograph and the record selecting means from a remote point, such as a wall-box station in establishments where the latter are employed.

The construction and operation of the devices referred to will perhaps be best understood by first considering the part of the structure at the wall-box station, this being illustrated in Figs. 5 to 8 of the drawings. The wall-box, which is identified by the reference numeral 61, is provided with a coin slot 62 through which the coins are adapted to be inserted to start operation of the machine. The wall-box is also provided with a dial 63, upon the face of which is a series of numbers corresponding to the number of records on the carrier, said numbers and the names of the records being also indicated on a card or plate 64 on the front of the wall-box beneath said dial. A rotatable knob 65 is positioned centrally of the dial 63 and has an arrow 66 or other indicator on the face thereof. Said knob 65 is carried on a shaft 67 which extends inwardly through the dial 63 and carries at its inner end a switch arm, indicated diagrammatically in Fig. 9 by the arrow which is identified by the reference character 68. This switch arm is in alignment with the arrow 66 on the face of the knob 65 and is adapted to cooperate with a plurality of circularly spaced contacts 69 provided within the wall-box, one for each record on the carrier, the arrangement being such that when the knob 65 is turned to cause the arrow 66 to point to any particular number on the dial 63, the switch arm 68 will be turned into engagement with the particular contact 69 associated with the record corresponding to the number on the dial which is indicated by said arrow 66.

Before the coin is inserted in the coin slot 62, the knob 65 is turned to the position in which the arrow 66 points to the record which it is desired to have played. The coin is then inserted and, in dropping through the coin chute 62, strikes a lever 71 of a double contact switch 72 which is pivoted at 73 to a plate 74 positioned on the interior of the wall box.

The portion of the switch above the pivot 73 is bifurcated, providing two arms 75 and 76, which are adapted, when moved from the full line to the dotted line position shown in Fig. 7, to engage contacts 77 and 78 which are connected, respectively, by wires 79 and 81 with a circuit controller 90 and with the switch arm 68. The switch is normally held in the full line position shown in Fig. 7 by means of a spring 80 which is secured at its lower end to the switch lever 71 and at its upper end to the fixed plate 74. The circuit controller is positioned across the main line, the two sides of which are indicated, respectively, by the wires 82 and 83, the construction of said circuit controller being such as to cause the circuit to be closed when a coin is inserted and to be broken upon completion of the playing of a record, or of a plurality of records if a multiple coin circuit controller be employed. The construction of such devices is well known in the art and, since they are not necessary to an understanding of the present invention, the details are not illustrated in the drawings. An example of a multiple coin circuit controlling device of this type is shown in United States Patent No. 1,198,861.

Each of the contacts 69 has a connection 84 with one of a series of magnets 85 spaced around the shaft 12, as shown in Figs. 1, 3 and 4, and diagrammatically in Fig. 9. Said magnets are supported in a circular frame 86 and, as shown in detail in Fig. 4, each magnet has associated therewith an armature 87 which is pivotally mounted, as indicated at 88, and is normally held away from the magnet by means of a spring 89 connected at one end to the outer end of the armature and at the other end to a bracket 91 on the frame. Said magnets are spaced around the shaft 12 in position corresponding to the position of the records on the record carrier, there being one magnet for each record and each magnet, as above indicated, being connected with a particular contact 69 in the wall-box 61. If it is desired to have a particular record played, No. 6 for example, the knob 65 on the dial 63 is turned to cause the arrow 66 to point to the No. 6 on the dial which moves switch arm 68 into engagement with the corresponding contact 69 and causes the magnet associated with the No. 6 record to be energized. The associated armature 87 is thus attracted to its magnet and when in its inner position is engaged by a latch 92 which has a beveled end-portion 93 over which the end of the armature may pass, said latch being pivoted at 94 and being normally urged toward the closed position by means of an expansion spring 95 mounted on a stud 96 on the end of the latch opposite the part thereof which engages the armature, said spring being adapted to be compressed between this end of the latch and a fixed frame part 97, as clearly shown in Fig. 4. A contact 98 is carried on a bracket 98' secured to the under-side of the frame part 97 and is connected by a wire 99 with one side of a circuit including the lock-out magnet 54, which, as previously described, serves when energized to hold the latch 52 in position to engage the roller 45 on the arm 40, thereby holding the reproducer mechanism out of action, the parts last described being shown in detail in Fig. 1.

The armature 87 also carries a contact, which is indicated by the reference numeral 101, and which is connected with the opposite side of the lock-out magnet circuit just mentioned, so that when the contacts 98 and 101 are in engagement, as shown in Fig. 4, said lock-out magnet circuit will be closed and the instrument will be prevented from playing until said circuit is broken.

The shaft 12 carries a sweeper 102 which is adapted to engage a cam portion 103 on the latch 92 as said shaft 12 is rotated, thus turning said latch upon its pivot in counter-clockwise direction (viewing Fig. 4) and disengaging the same from the armature 87, allowing the latter to be moved outwardly by its spring 89 thereby disengaging the contact 101 from the contact 98 and breaking the lock-out magnet circuit, whereupon the latch 52 will be permitted to drop out of engagement with the roller 45, permitting the latter to follow the grooves in the cam 37, thus moving the reproducer mechanism into playing position when the next record is presented at the playing station. It will be apparent that the machine is thus prevented from playing any of the records until the selected one arrives at or approaches the playing station, at which time the latch 92, which cooperates with the armature 87 of the magnet 85 associated with the selected record, is actuated by the sweeper 102, thus disengaging the contacts 98 and 101 and breaking the lock-out magnet circuit.

If, during the playing of a record or when the machine is idle, another record is selected, the operation above described will be repeated with the result that the lock-out magnet will be energized and will hold the reproducer mechanism out of action as the record carrier rotates until the newly selected record has been brought to the playing station, at which time the lock-out magnet will be deenergized, as previously described. It will be evident that if switch arm 68 is turned to a position intermediate a pair of adjacent contacts 69, so that no selection is made, the records will be played in succession as they are arranged upon the record carrier. This is due to the fact that if switch arm 68 is not brought into contact with one of the contacts 69, none of the magnets 85 will be energized when a coin is introduced through coin slot 62. Therefore, no circuit will be completed through the coil of hold out magnet 54 and as long as said magnet remains deenergized latch member 52 remains out of operative engagement with cam roller 45, and the latch is free to fall into each of the cam grooves 39 to permit playing of the records in the order in which they are arranged on the carrier. By using a multiple coin circuit controller at the point indicated by the reference character 90 in Fig. 9, a plurality of coins may be inserted at one time and a corresponding number of records will be played in succession before the playing circuit 82, 83 of the machine is broken.

In Fig. 9, a wiring diagram for two wall-boxes, or coin stations, is shown, it being noted that each is connected to the series of selector magnets 85, and it will be understood that any number of wall-boxes, or coin stations, may be so connected. A coin station may be, and ordinarily is, provided on the machine itself, this being indicated by the reference character 104 in Fig. 1, and it is to be understood that this station is also connected to the selector magnets in the manner described, so that a selection may be made either at the machine itself or at any wall-box station. The device, however, is particularly adapted for remote control since, by reason of the electrical devices employed, it is not necessary that the portion of the selector mechanism which requires operation by the customer be positioned upon the machine, it being possible to locate it at any convenient point as may be desired.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the construction hereinbefore described being merely a preferred embodiment thereof.

I claim:

1. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means including a plurality of electric circuits and a selector switch which may be located remotely from the phonograph; and electrical devices controllable by said switch through a selected one of said circuits for preventing the movement of the reproducer into operative position until the selected record arrives at the playing station.

2. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means including a plurality of electric circuits and a selector switch which may be located remotely from the phonograph; and electrical devices controllable by said switch through a selected one of said circuits for preventing the stopping of the carrier and movement of the reproducer into operative position until the selected record arrives at the playing station.

3. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means; a latching device; a magnet adapted, when energized, to hold said latching device in position to lock said reproducer in inoperative position; a series of additional magnets individually identified with particular records on said carrier and each having a circuit closer associated therewith; a corresponding series of electric circuits, each including said first mentioned magnet and one of said magnets of the series; switch mechanism associated with said record selecting means for energizing the magnet identified with the selected record to thereby operate the circuit closer associated with said magnet and close the circuit to said latch control magnet; means for releasably holding said circuit closer in closed position; and means for releasing said circuit closer when the selected record arrives at the playing station to thereby deenergize the latch control magnet and allow the latch to release the reproducer for movement into playing position upon said selected record.

4. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means located remotely from the phonograph; a latching device; a magnet adapted, when energized, to hold said latching device in position to lock said reproducer in inoperative position; a series of additional magnets individually identified with particular records on said carrier and each having a circuit closer associated therewith; a corresponding series of electric circuits, each including said first mentioned magnet and one of said magnets of the series; switch mechanism associated with said record selecting means for energizing the magnet identified with the selected record to thereby operate the circuit closer associated with said magnet and close the circuit to said latch control magnet; means for releasably holding said circuit closer in closed position, and means for releasing said circuit closer when the selected record arrives at the playing station to thereby deenergize the latch control magnet and allow the latch to release the reproducer for movement into playing position upon said selected record.

5. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means; a latching device; a magnet adapted, when energized, to hold said latching device in position to lock said reproducer in inoperative position, a series of additional magnets individually identified with particular records on said carrier and each having a circuit closer associated therewith; a corresponding series of electric circuits, each including said first mentioned magnet and one of said magnets of the series; switch mechanism associated with said record selecting means for energizing the magnet identified with the selected record to thereby operate the circuit closer associated with said magnet and close the circuit to said latch control magnet; means for releasably holding said circuit closer in closed position, and means movable with the carrier for releasing said circuit closer when the selected record arrives at the playing station to thereby deenergize the latch control magnet and allow the latch to release the reproducer for movement into playing position upon said selected record.

6. In an automatic, multiple-record phonograph: a record carrier for a plurality of records; a shaft on which said carrier is mounted; coin-controlled electrical means for rotating said shaft; a reproducer mounted adjacent said carrier; means for automatically moving said reproducer into and out of operative relation to the records on said carrier; record selecting means; a latching device; a magnet adapted, when energized, to hold said latching device in position to lock said reproducer in inoperative position; a series of additional magnets concentrically located around said carrier shaft and individually identified with particular records on said carrier, each said magnet having a circuit closer associated therewith; a corresponding series of electric circuits, each including said first mentioned magnet and one of said magnets of the series; switch mechanism associated with said record selecting means for energizing the magnet identified with the selected record to thereby operate the circuit closer associated with said magnet and close the circuit to said latch control magnet; means for releasably holding said circuit closer in closed position, and means movable with the carrier for releasing said circuit closer when the selected record arrives at the playing station to thereby deenergize the latch control magnet and allow the latch to release the reproducer for movement into playing position upon said selected record.

7. In an automatic, multiple-record phonograph: a record carrier having a plurality of records; coin-controlled electrical means for actuating said carrier; a reproducer mounted adjacent said carrier; means for automatically positioning said reproducer in operative relation to the records when the latter are brought to rest at the playing station; means for holding said reproducer in inoperative position pending the presentation to the playing station of a selected record; record selecting means including a plurality of electric circuits and a remotely located selector switch having a plurality of contacts corresponding to the number of records on said carrier and each associated with a particular record: and mechanism connectible with said switch through a selected contact and circuit and controllable by adjustment of said switch to release said reproducer holding means to allow the reproducer to move into playing position when a record selected by operation of said selecting means is brought to rest at the playing station.

8. In an automatic, multiple-record phonograph: a record carrier having a plurality of records; coin-controlled electrical means for actuating said carrier; a reproducer mounted adjacent said carrier; means for automatically positioning said reproducer in operative relation to the records when the latter are brought to rest at the playing station; means for holding said reproducer in inoperative position pending the presentation to the playing station of a selected record; record selecting means including a plurality of electric circuits and a remotely located selector switch having a plurality of contacts corresponding to the number of records on said carrier and each associated with a particular record; mechanism connectible with said switch through a selected contact and circuit and controllable by adjustment of said switch to release said reproducer holding means to allow the reproducer to move into playing position when a record selected by operation of said selecting means is brought to rest at the playing station; and means operable by the movement of said reproducer to the playing position to stop the record carrier when the selected record arrives at said playing station.

9. In an automatic, multiple-record phonograph: a record carrier for a plurality of records; electrical means for operating said carrier; a reproducer mounted adjacent said carrier; means for automatically moving said reproducer into and out of operative relation to the records on said carrier; record selecting means located remotely from the phonograph; electrical devices associated therewith for preventing the movement of the reproducer into operative position until the selected record arrives at the playing station; coin-controlled means for operating said carrier moving means, said coin-controlled means including a coin-operated switch positioned adjacent said selecting means; and a second switch for controlling the operation of said selecting means, said last mentioned switch being associated with said coin-operated switch and being arranged for actuation by the same coin which is employed for actuating the coin-operated switch.

10. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means including a remotely disposed selector device adapted to be set and being thereafter automatically operative to control the playing of a selected record, said selector device including a manually operable switch having a number of contacts corresponding to the number of records on the carrier and each associated with a particular record and a corresponding number of electric circuits, each including one of said contacts; and electrical devices associated with said selector device and controllable by operation of said switch for preventing the movement of the reproducer into operative position until the selected record arrives at the playing station.

11. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means including a plurality of electric circuits and a selector switch which may be located remotely from the phonograph; and electrical devices controllable by said switch through a selected one of said circuits for preventing the movement of the reproducer into operative position until the selected record arrives at the playing station, said devices including a plurality of magnetic elements individually associated with particular records and particular selector circuits for controlling said movement of the reproducer.

12. In an automatic, multiple-record phonograph: a record carrier for a plurality of records; coin-controlled electrical means for operating said carrier; a reproducer mounted adjacent said carrier; means for automatically moving said reproducer into and out of operative relation to the records on said carrier; record selecting means including a plurality of electric circuits and a selector switch which may be located remotely from the phonograph; and electrical devices controllable by said switch through a selected one of said circuits for preventing the movement of the reproducer into operative position until the selected record arrives at the playing station, said devices including a plurality of electrically-operated make-and-break devices individually associated with particular records and particular selector circuits and a circuit controlled by said make-and-break device for controlling said movement of the reproducer.

13. In an automatic, multiple-record phonograph: a record carrier for a plurality of records; a reproducer movably mounted adjacent said carrier; means including an electric device for controlling the movement of said reproducer into operative relation to the records on said carrier; and record selecting means including a selector element operable by one playing the phonograph and electrically-operated means, including a plurality of magnets individually associated with particular records on said carrier and adapted to be selectively energized in accordance with the positioning of said selector element, for controlling said electric device in the reproducer controlling means to cause the latter to effect movement of the reproducer into operative relation to the selected record only, in the event that a selection has been made.

14. In an automatic, multiple-record phonograph: a record carrier for a plurality of records; a reproducer movably mounted adjacent said carrier; means including an electric device for controlling the movement of said reproducer into operative relation to the records on said carrier; and record selecting means including a selector element operable by one playing the phonograph and electrically-operated means, including a plurality of electrically-operated make-and-break devices individually associated with particular records on said carrier and adapted to be selectively operated in accordance with the positioning of said selector element, for controlling said electric device in the reproducer controlling means to cause the latter to effect movement of the reproducer into operative relation to the selected record only, in the event that a selection has been made.

BERT E. MILLS.